US005536065A

United States Patent [19]

Girardi

[11] Patent Number: 5,536,065

[45] Date of Patent: Jul. 16, 1996

[54] SADDLE FOR A BICYCLE CAPABLE OF HOOKING DIRECTLY TO THE SLEEVE WHICH SUPPORTS THE SADDLE

[75] Inventor: Antonio Girardi, Rossano Veneto, Italy

[73] Assignee: Selle San Marco di Girardi Comm. Luigi S.p.A., Rossano Veneto, Italy

[21] Appl. No.: 496,578

[22] Filed: Jun. 29, 1995

Related U.S. Application Data

[63] Continuation-in-part of Ser. No. 204,764, Mar. 1, 1994, abandoned.

[51] Int. Cl.[6] ........ B62J 1/00

[52] U.S. Cl. ........ 297/215.14; 297/215.15; 297/DIG. 2

[58] Field of Search ........ 297/195.1, 215.13, 297/215.14, 215.15, 215.16, DIG. 2

[56] References Cited

U.S. PATENT DOCUMENTS 3,992,054 11/1976 Campagnolo ........ 297/215.15
4,440,440 4/1984 Juy ........ 297/215.14
4,502,811 3/1985 Patriarca ........ 297/215.14 X
4,836,604 6/1989 Romano ........ 297/215.14

*Primary Examiner*—Milton Nelson, Jr.
*Attorney, Agent, or Firm*—Bucknam and Archer

[57] ABSTRACT

The body (1) of the saddle is provided in the lower part with two rectilinear limbs (2 and 3) which advantageously have a circular shape at the respective ends and which are turned towards the interior. These two limbs are grasped by the parts (4 and 5) of the clamp. These parts are connected between themselves and connected with the head (6) of the sleeve (7) with a screw (8). The latter has advantageously an Allen head (9). In this manner, the hooking of the body (1) of the saddle to the sleeve (7) is simplified and it is also possible to regulate the position of the saddle both in the horizontal direction and in the inclination of the saddle by maneuvering the screw (8). The saddle consists of a one-piece monohull body.

1 Claim, 3 Drawing Sheets

1
3
2

SADDLE FOR A BICYCLE CAPABLE OF HOOKING DIRECTLY TO THE SLEEVE WHICH SUPPORTS THE SADDLE

This application is a Continuation-in-part of U.S. Ser. No. 08/204,746 filed Mar. 1, 1994 now abandoned.

FIELD OF THE INVENTION

The present invention relates to saddles for bicycles.

SUMMARY OF THE INVENTION

One novel feature of the invention resides in the fact that the body of the saddle has a particular conformation which permits the body of the saddle to be hooked directly to the sleeve of the saddle, thus avoiding the conventional fork/frame which has been used with the known saddles.

The saddle consists of a one-piece monohull body. The application of this novel feature will also be made on saddles in bicycles used for traveling which at present are provided with a frame, the frame being with or without springs.

It is obvious that the present invention constitutes substantial advantages in the case of bicycles used for races because in addition to the foregoing, it is possible to substantially reduce the weight of the bicycle and the components essentially required for the assembly of the saddle. In this manner, it is possible to simplify the mounting of the saddle and the regulation of the position of the saddle by the user.

The novel features of the present invention are based on a novel concept for hooking the saddle to the sleeve, a concept which modifies in a determined manner the connection between the two above mentioned members.

Essentially there is provided a particular modification in the construction of the body of the saddle which permits the conformation in the lower part of two rectilinear members turned towards the interior which acquire a cylindrical shape and which are directly hooked with the revolving clamp mounted on the sleeve which supports the saddle.

According to another novel feature of the invention, there is provided a single screw which is easily maneuverable by the user and which in view of its particular shape, remains totally invisible from the exterior and serves the purpose of blocking the clamp which carries the saddle to the vertical sleeve which fixes the saddle and simultaneously fixes the lower members of the saddle to the same clamp.

In this manner, there is guaranteed the possibility of regulating the degree of inclination of the saddle with respect to its supporting sleeve and the possibility of regulating the position of the saddle in the longitudinal direction according to the requirements of the user.

In this manner, the conventional rear springs which have been used to support the saddle may be eliminated because the saddle, due to its particular conformation, permits to guarantee sufficient flexibility both for bicycles used for traveling as well as for bicycles being used in contests.

BRIEF DESCRIPTION OF THE DRAWINGS

The invention will be explained in more detail hereinbelow by reference to the accompanying drawings which illustrate a particular embodiment of the invention. This embodiment is shown merely by way of example and is not limitative because the shape of the saddle may assume particular conformations which do not modify the novel features of the invention.

The figures are.

DESCRIPTION OF THE PREFERRED EMBODIMENTS

Figure 1:
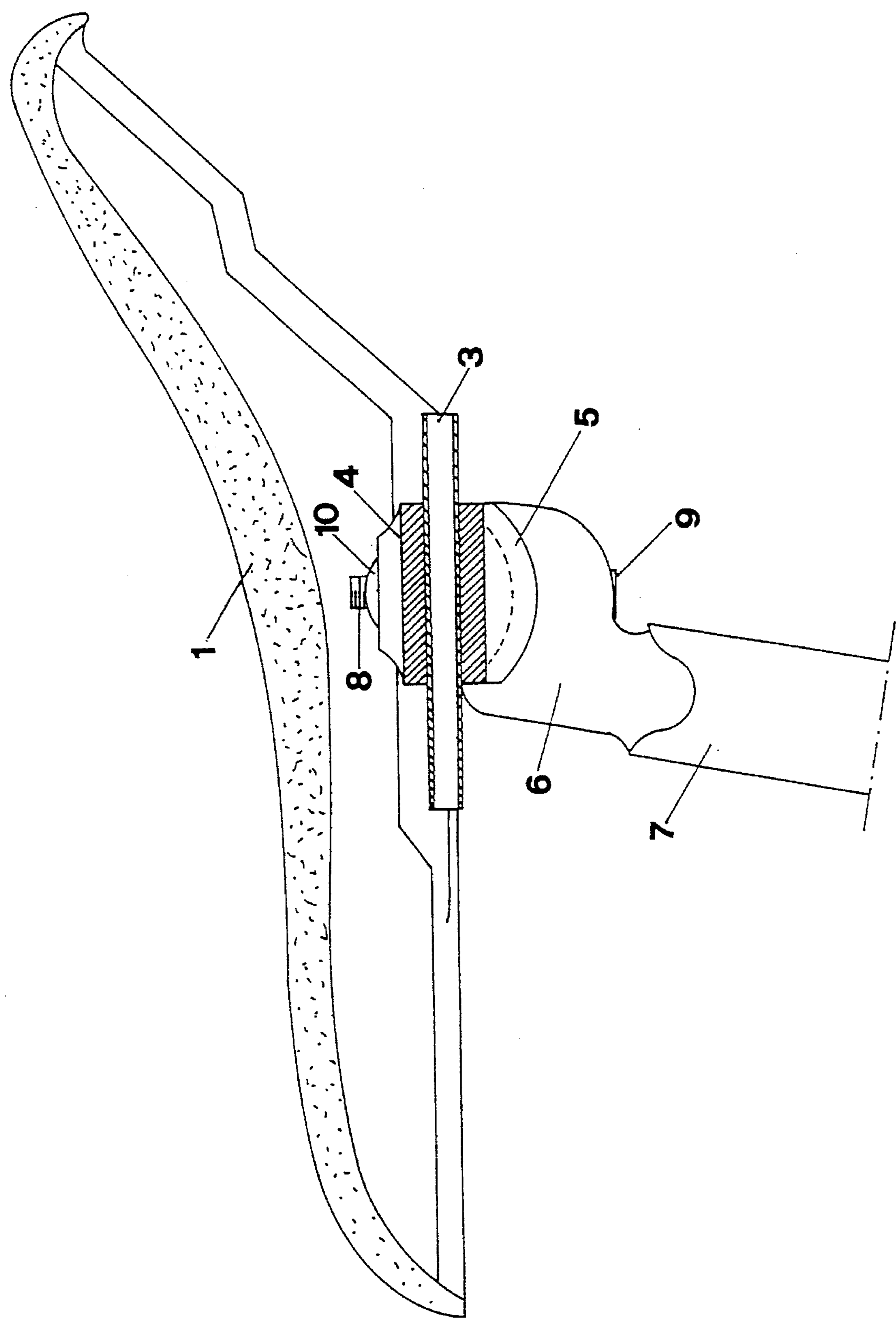
FIG. 1 is a side view in cross section of the saddle of the present invention.
Figure 2:
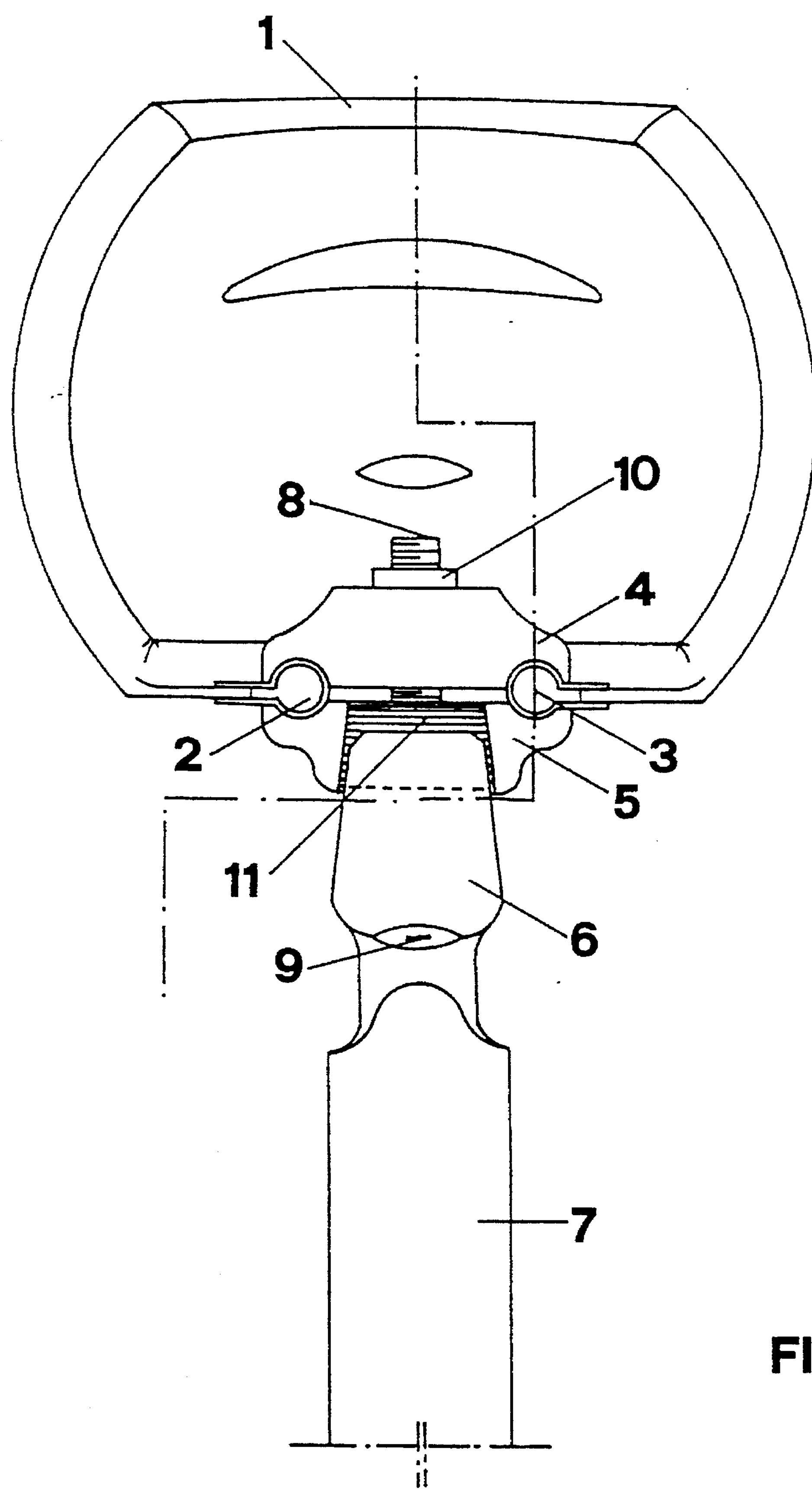
FIG. 2 is a rear view of the saddle.
Figure 3:
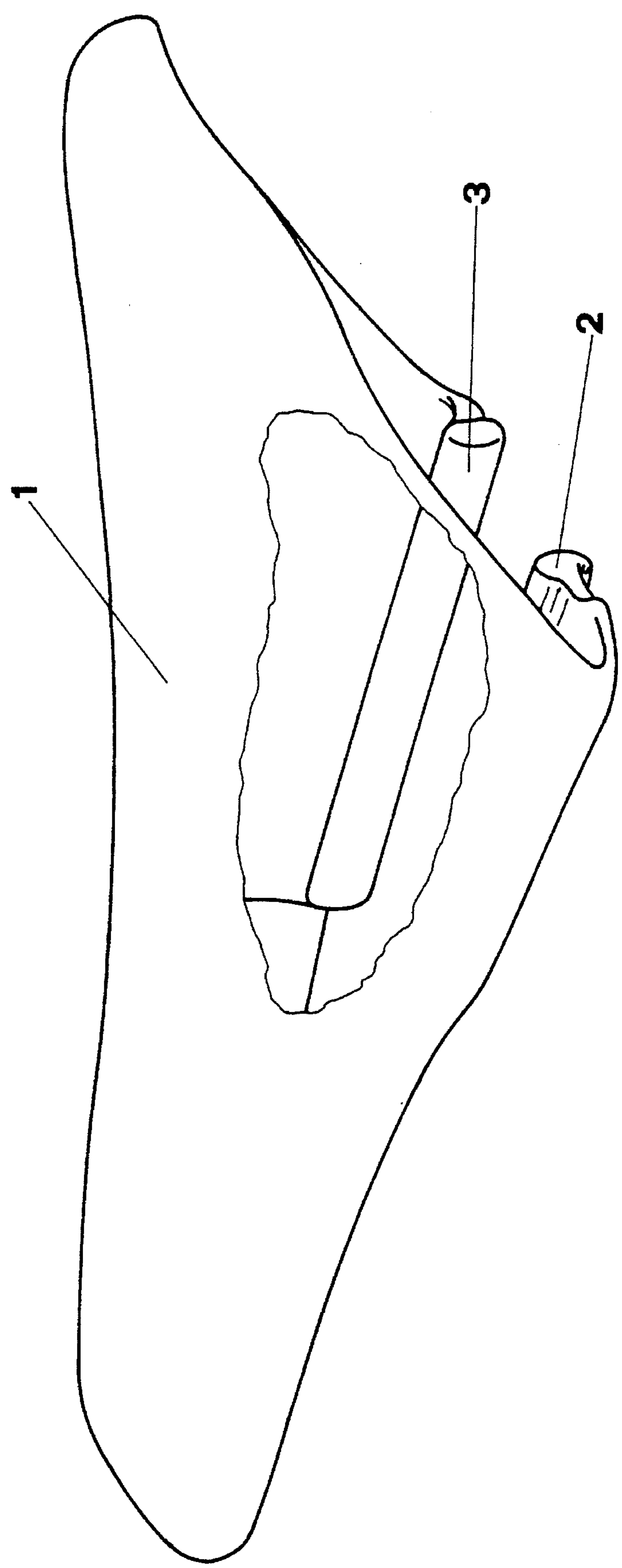
FIG. 3 is a perspective view of the saddle of FIGS. 1 and 2 with a portion thereof broken away.

As shown in FIGS. 1 and 2, the body of the saddle (1) assumes a particular shape particularly in the lower part where there are two limbs (2 and 3) which are rectilinear and parallel, for a few centimeters and at the end they are of a circular shape. The two limbs (2 and 3) may be easily grasped by the two parts of the clamp (4 and 5), these parts (4 and 5) being fixed to the head (6) of the vertical sleeve (7) which serves the purpose of fixing the saddle to the frame of the bicycle.

The clamp (4 and 5) is integral with the sleeve (7).

The screw (8) which preferably has a head (9) of the Allen type is completely enclosed in the head (6) of the vertical sleeve (7). The screw is screwed with the shaped member (10) which is provided with a threaded opening within which the screw (8) is engaged.

In this manner, it is possible with the single blocking of screw (8) to the member (10) by maneuvering the Allen head (9) of the screw to block in the desired position the clamp (4 and 5) to the head (6) of the sleeve (7) and also members (2 and 3) of the saddle (1) to the clamp (4 and 5). In this manner the saddle is fixed in the desired position.

By slightly releasing the screw (8), it is possible to let the two members (2 and 3) of the body (1) of the saddle to slide in the longitudinal direction between the elements (4 and 5) of the clamp for the purpose of regulating the horizontal position of the saddle and also to cause the elements (4 and 5) of the clamp to rotate with respect to the head (6) of the sleeve (7) for the purpose of varying the inclination.

Advantageously the contact surfaces (11) formed in the lower part (5) of the clamp as well as the upper surface of the head (6) of the sleeve (7) are provided with knurlings in the horizontal direction which make the reciprocal fixation easier.

The advantages obtained according to the present invention due to the particular structure of the saddle are clear because by simply maneuvering the screw (8) it is possible to regulate in the horizontal direction the position of the saddle and its inclination on the basis of the requirements of the user. Further the saddle is lighter compared with known saddles and at the same time is very strong.

What is claimed is:

1. The combination of a saddle (1) and a sleeve (7) for supporting said saddle, said saddle being capable of being directly hooked to said supporting sleeve (7), a clamp supporting the saddle, said clamp having two jaws (4 and 5), said saddle having a one piece monohull body (1), said monohull body comprising two lower rectilinear members (2 and 3), said lower rectilinear members (2 and 3) being horizontally oriented and integral with said saddle, said rectilinear members having an enlarged portion and being inserted within said jaws (4 and 5) of said clamp which supports the saddle, said sleeve (7) has a head (6), a single screw (8) capable of blocking said two jaws (4 and 5) of said clamp along said two rectilinear members (2 and 3) of said monohull body (1) of said saddle; whereby by releasing said screw (8), said rectilinear members (2 and 3) can be slid in their longitudinal direction between said jaws and the position of the saddle in the longitudinal direction is adjusted, said jaws are allowed to rotate with respect to said head (6) of said sleeve whereby the inclination of the saddle is adjusted.

* * * * *